US010963772B1

(12) United States Patent
Longobardi et al.

(10) Patent No.: US 10,963,772 B1
(45) Date of Patent: Mar. 30, 2021

(54) MULTI RADIO FREQUENCY IDENTIFICATION (RFID) DEVICE WITH SELECTIVE ACTIVATION OF RFID TAGS

(71) Applicant: HCL Technologies Italy S.p.A., Vimodrone (IT)

(72) Inventors: Giuseppe Longobardi, Rome (IT); Pasquale Peluso, Rome (IT); Maria Teresa Caira, Rome (IT); Filippo Sorino, Rome (IT); Alessandro D'Angeli, Rome (IT); Valentina Fusco, Rome (IT); Enrico Petrachi, Rome (IT)

(73) Assignee: HCL Technologies Italy S.p.A.

( * ) Notice: Subject to any disclaimer, the term of this patent is extended or adjusted under 35 U.S.C. 154(b) by 0 days.

(21) Appl. No.: 16/852,421

(22) Filed: Apr. 18, 2020

(51) Int. Cl.
*G06K 19/077* (2006.01)

(52) U.S. Cl.
CPC . *G06K 19/07796* (2013.01); *G06K 19/07762* (2013.01)

(58) Field of Classification Search
CPC .................. G06K 19/07796; G06K 19/07762
USPC ........................................................ 235/492
See application file for complete search history.

(56) References Cited

U.S. PATENT DOCUMENTS

| 8,295,766 | B2 | 10/2012 | Adams, Jr. et al. |
| 9,301,087 | B1 | 3/2016 | Pappas et al. |
| 9,311,586 | B2 | 4/2016 | Robinette et al. |
| 9,697,459 | B2 | 7/2017 | Finn et al. |
| 9,811,955 | B2 | 11/2017 | Russell et al. |
| 9,907,375 | B1* | 3/2018 | Kitchen ............... A45C 13/005 |
| 10,176,349 | B1* | 1/2019 | Mountz ................. G06F 1/1698 |
| 2007/0040653 | A1* | 2/2007 | Potts ................ G06K 19/07327 340/10.1 |
| 2008/0099566 | A1* | 5/2008 | Maus ..................... G06K 17/00 235/492 |
| 2009/0152353 | A1* | 6/2009 | Tsirline ............... G06K 7/0008 235/439 |

(Continued)

FOREIGN PATENT DOCUMENTS

| CN | 106773601 A | 5/2017 |
| WO | 2014137916 A1 | 9/2014 |

OTHER PUBLICATIONS

"RFID Reader writer" https://www.amazon.com/English-Multi-Frequency-Copier-Reader-Writer/dp/B07GXBF6DW; Device to read and write (in order to copy) RFID tags.

(Continued)

*Primary Examiner* — Allyson N Trail
(74) *Attorney, Agent, or Firm* — Kendal M. Sheets (57) ABSTRACT

A wearable multi Radio Frequency Identification (RFID) device is disclosed. The wearable multi RFID device includes a container that includes an inner housing that further includes a plurality of fixed slots configured to receive a plurality of RFID tags. The container further includes an outer casing that at least partially encloses the inner housing circumferentially and is configured to slide around the inner housing in the container. The outer casing includes a layer of electromagnetic shielding material. The outer casing is further configured to shield the plurality of RFID tags from being scanned, at a first position and selectively expose one of the plurality of RFID tags for being scanned, at an associated second position from a plurality of second positions, based on mapping with at least one criterion defined by a user.

20 Claims, 9 Drawing Sheets

(56) References Cited

U.S. PATENT DOCUMENTS

| | | | | |
|---|---|---|---|---|
| 2011/0047053 | A1* | 2/2011 | Kim | G01S 19/48 |
| | | | | 705/30 |
| 2014/0236842 | A1* | 8/2014 | Salminen | G06Q 20/326 |
| | | | | 705/75 |
| 2015/0059937 | A1* | 3/2015 | Singer | A45C 11/32 |
| | | | | 150/147 |
| 2015/0109106 | A1 | 4/2015 | Gomez et al. | |
| 2016/0239694 | A1* | 8/2016 | Chin | G07C 9/00896 |
| 2016/0241698 | A1 | 8/2016 | Kim | |
| 2018/0353810 | A1* | 12/2018 | Kim | A61B 5/024 |
| 2019/0034775 | A1 | 1/2019 | Martinez de Velasco Cortina et al. | |
| 2019/0266463 | A1* | 8/2019 | Wang | A45C 1/06 |
| 2020/0005113 | A1 | 1/2020 | Schnippering | |
| 2020/0069017 | A1* | 3/2020 | Yap | A45C 11/32 |
| 2020/0405028 | A1* | 12/2020 | Shields | A45C 11/182 |
| 2020/0410314 | A1* | 12/2020 | Stahlhut | G06Q 20/341 |
| 2021/0027710 | A1* | 1/2021 | Chong | G09G 3/3233 |
| 2021/0029493 | A1* | 1/2021 | Duan | G08B 7/06 |

OTHER PUBLICATIONS

"An Attempt to Replace Multiple RFID Cards With A Single Hacked-together Tag"; https://hackaday.com/2013/01/21/an-attempt-to-replace-multiple-rfid-cards-with-a-single-hacked-together-tag/.

"Custom silicon wristbands with pocket slot for insert EMV mini tag"; https://huayuansh.en.alibaba.com/product/60678475978-221085518/custom_silicon_wristbands_with_pocket_slot_for_insert_EMV_mini_tag_html.

https://www.idcband.com/blog-us/.

https://www.aventri.com/products/smart-tag.

* cited by examiner

MULTI RADIO FREQUENCY IDENTIFICATION (RFID) DEVICE WITH SELECTIVE ACTIVATION OF RFID TAGS

TECHNICAL FIELD

This disclosure relates generally to Radio Frequency Identification (RFID) device and more particularly to a multi RFID device with selective activation of RFID tags.

BACKGROUND

With advancement of technology, in everyday life, the use of Radio Frequency Identification (RFID) devices has widely increased. RFID devices are extensively used to provide a user with access to restricted areas or services, for example, office, bus, subway, gym, or home garage. A user may use RFID cards to access multiple such restricted areas. For each of these areas, the user may be required to use a different RFID card. As result, the user may have to manage multiple RFID cards at any given time, resulting in a swollen wallet that is difficult to carry around. Moreover, at may instances the user may forget to carry along one these RFID cards or may even forget which specific RFID card is to be used at a certain location. This may lead to a lot of inconvenience and hassle at a user's end.

One of the conventional technologies uses multiple RFID tags in a single device. However, this conventional technology only allows manual selection of an RFID tag that is to be activated for being scanned. Moreover, in these conventional technologies, analog keys may be provided, which may require prolonged pressing in order to activate an RFID tag. Another one of the conventional technologies, which uses multiple RFID tags in a single device, involves simultaneous activation of all passive circuits for the RFID tags, without any differentiation based on the type of access required. This leads to wastage of time and energy. Thus, the conventional technologies do not provide a device that allows use of multiple RFID tags in an optimized manner.

SUMMARY

In one embodiment, a wearable multi Radio Frequency Identification (RFID) device is provided. The wearable multi RFID device includes a container that includes an inner housing that further includes a plurality of fixed slots that are configured to receive a plurality of RFID tags. The container further includes an outer casing that at least partially encloses the inner housing circumferentially and is configured to slide around the inner housing in the container. The outer casing includes a layer of electromagnetic shielding material. The outer casing is configured to shield the plurality of RFID tags from being scanned, at a first position. The outer casing is further configured to selectively expose one of the plurality of RFID tags for being scanned, at an associated second position from a plurality of second positions.

In another embodiment, a method of selectively activating RFID tags in a wearable multi RFID device is provided. The method includes capturing a set of external parameters. The method further includes comparing values of each of the set of external parameters with at least one criterion associated with each of a plurality of RFID tags. Each of the plurality of RFID tags are inserted in one of a plurality of fixed slots in an inner housing within the wearable multi RFID device. The method includes exposing an RFID tag from the plurality of RFID tags for being scanned, when values of at least one of the set of external parameters satisfy at least one criterion associated with the RFID tag. A remaining plurality of RFID tags remain shielded via an electromagnetic shielding material.

In yet another embodiment, a non-transitory computer-readable medium, for allocating resources to containers, having stored thereon, a set of computer-executable instructions causing a computer comprising one or more processors to perform steps that include capturing a set of external parameters; comparing values of each of the set of external parameters with at least one criterion associated with each of a plurality of RFID tags, wherein each of the plurality of RFID tags are inserted in one of a plurality of fixed slots in an inner housing within the wearable multi RFID device; and exposing an RFID tag from the plurality of RFID tags for being scanned, when values of at least one of the set of external parameters satisfy at least one criterion associated with the RFID tag, wherein a remaining plurality of RFID tags remain shielded via an electromagnetic shielding material.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
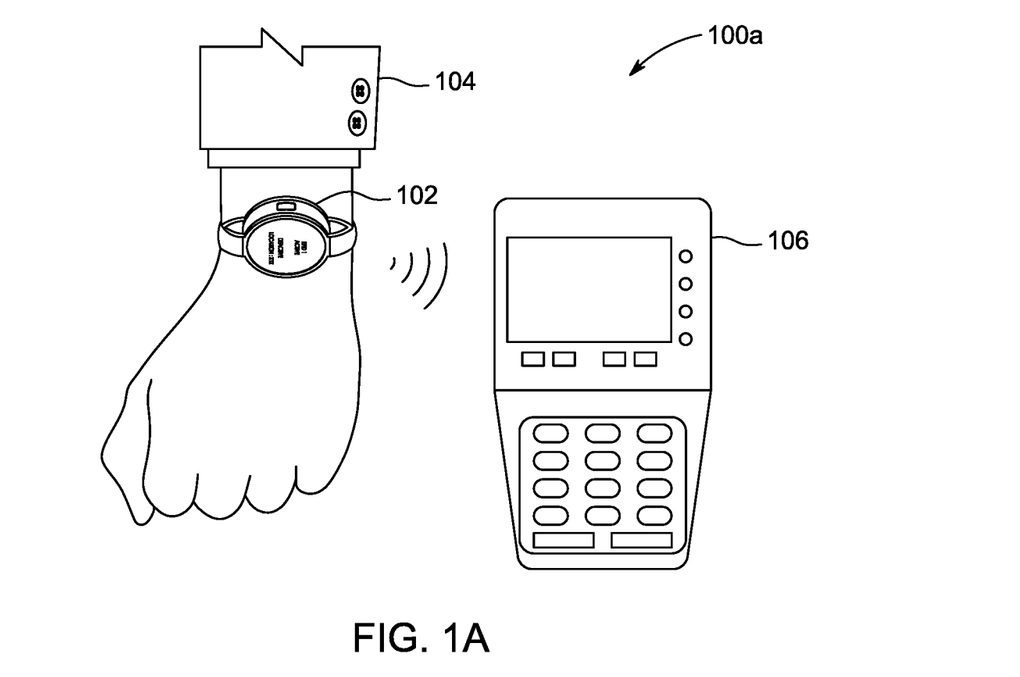
FIGS. 1A and 1B illustrate exemplary environments in which various embodiments associated with a wearable multi Radio Frequency Identification (RFID) device may be employed.
Figure 1B:
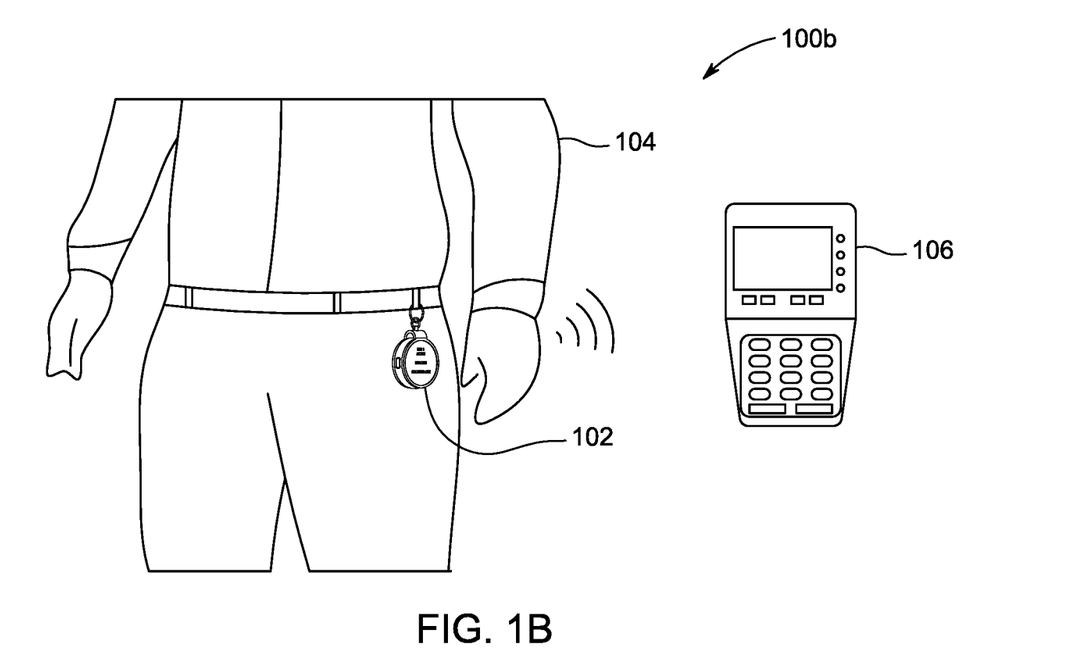

Referring to FIGS. 1A and 1B, exemplary environments 100a and 100b are illustrated in which various embodiments associated with a wearable multi Radio Frequency Identification (RFID) device 102 may be employed. In FIG. 1A, the wearable multi RFID device 102 may be in the form of a wristwatch or a wristband that a user 104 is wearing on his/her wrist. The wearable multi RFID device 102 may also be integrated within a smartwatch. However, in FIG. 1B, the wearable multi RFID device 102 may be a key ring, that is attached to a belt or to trousers of the user 104. It will be apparent to a person skilled in the art that the wearable multi RFID device 102 may not be limited to the above examples, and other implementation are within the scope of the invention. Examples of other implementations may include, but are not limited to a badge holder, a lanyard, or a pendant. In both the exemplary environments 100a and 100b, the user 104 may use the wearable multi RFID device 102 to access a restricted area or service, for example, an office. It will be apparent to a person skilled in the art that other exemplary environments may be relevant to employ various embodiments associated with the wearable multi RFID device 102. Examples of such exemplary environments may include, but are not limited to parking areas, gymnasiums, membership based clubs, event halls, conferences, public transport (for example, metros, trains, or buses), or home garage.

The wearable multi RFID device 102 may include a plurality of fixed slots (not shown in FIG. 1), each of which is configured to receive an RFID tag. In other words, the wearable multi RFID device 102 is configured to receive a plurality of RFID tags. Each of the plurality of RFID tags may be reprogrammable. Additionally, each of the plurality of RFID tags may be an active RFID tag or a passive RFID tag. The wearable multi RFID device 102 may further include an outer casing (not shown in FIG. 1) that includes a layer of electromagnetic shielding material. Examples of the electromagnetic shielding material may include, but are not limited to Aluminum, Copper, or Nickle. Additionally, when the electromagnetic shielding material is a metal, it may be in the form of metal sheets, metal foams, or metal screens.

A non-shielded portion in the outer casing, however, may not include the layer of the electromagnetic shielding material. The non-shielded portion, for example, may be slightly bigger than the average size of an RFID tag. Alternatively, the non-shielded portion may be slightly bigger than the size of a fixed slot. This is further explained in detail in conjunction with FIGS. 3A and 3B, FIGS. 4A and 4B, and FIGS. 5A and 5B. When the outer casing is at a first position (for example, a resting position) the outer casing, by way of the electromagnetic shielding material, shields each of the plurality of RFID tags from being scanned by an RFID scanner. In other words, in the first position, the non-shielded portion does not align with any of the plurality of fixed slots. Thus, each of the plurality of RFID tags is shielded.

However, when the outer casing is in a second position, it exposes (or activates) one of the plurality of RFID tags for being scanned. In other words, in the second position, the non-shielded portion aligns with a fixed slot from the plurality of fixed slots, and the remaining plurality of fixed slots remain shielded. It will be apparent that there may be a plurality of second positions, such that, each second position corresponds to location of a fixed slot from the plurality of fixed slots. By way of an example, if there are 10 fixed slots, each having an RFID tag therein, there may be 10 such second positions for the outer casing and the 11$^{th}$ position may be the first position, where RFID tags in each of the 10 fixed slots are shielded.

In an embodiment, an RFID tag may be exposed, when values of one or more of a set of external parameters satisfy one or more criteria associated with an RFID tag from the plurality of RFID tags. Examples of the external parameters may include one or more of, but are not limited to a location, network Service Set Identifiers (SSIDs), date and time, gesture, a cell ID of one or more neighboring Base Station (BS), or voice inputs. Additionally, each of the plurality of RFID tags may have one or more criteria associated with it.

In an embodiment, an RFID tag may have specific values of the external parameters as one or more criteria. Whenever a current value of any external parameter matches a specific value linked to the RFID tag, the RFID tag is exposed (or activated) for being scanned by an RFID scanner. By way of an example and referring to the depiction in FIG. 1A and FIG. 1B, an RFID tag may be linked or mapped to an office location. Whenever the user 104 is in the office location, the RFID tag in the wearable multi RFID device 102 may be automatically exposed for being scanned by an RFID scanner 106. By way of another example, an RFID tag may be linked or mapped to a network SSID of a Wireless Fidelity (Wi-Fi) connection in an office. Whenever the user 104 is in the vicinity of the office and the wearable multi RFID device 102 detects the network SSID, the wearable multi RFID device 102 may automatically expose the RFID tag for being scanned by the RFID scanner 106.

As an alternative to automatic exposure of an RFID tag from the plurality of RFID tags, a user may be able to manually expose a specific RFID tag in the wearable multi RFID device 102, by controlling (for example, by rotating) the outer casing. The wearable multi RFID device 102 may also include a display (not shown in FIG. 1) that may display details of an RFID tag that is currently exposed (or activated) for being scanned. Functioning of various components within the wearable multi RFID device 102 is further explained in detail in conjunction with FIG. 2-FIG. 8.

Figure 2:
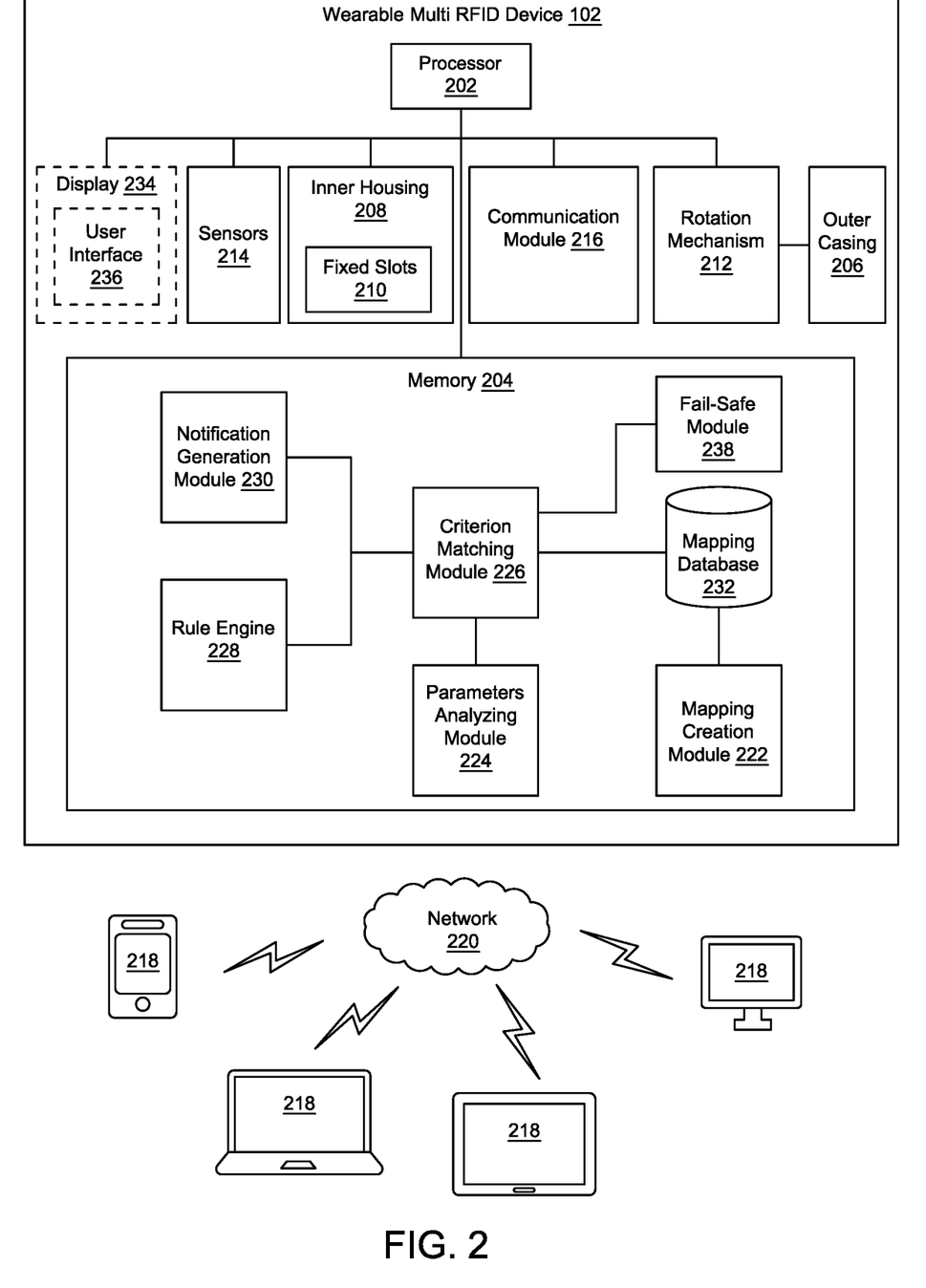
FIG. 2 is a functional block diagram depicting various components within a wearable multi RFID device, in accordance with an embodiment.

Referring now to FIG. 2, a functional block diagram depicting various components within the wearable multi RFID device 102 is illustrated, in accordance with an embodiment. The wearable multi RFID device 102 includes a processor 202 which is communicatively coupled to a memory 204, which includes processor instructions that when executed by the processor 202, causes the processor to perform various functions of the wearable multi RFID device 102, as explained in detail in subsequent description. The memory 204 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

The wearable multi RFID device 102 also includes an outer casing 206 and an inner housing 208, which further includes a plurality of fixed slots 210. Each of the plurality of fixed slots 210 may be configured to receive a plurality of RFID tags. Each of the plurality of RFID tags may either be a passive RFID tag or an active RFID tag. Further, each of the plurality of fixed slots 210 may also be configured to eject the received RFID tag, in response to a user action. By way of an example, a fixed slot 210 may be in the form of a SIM card holder that includes a SIM card tray and an ejection mechanism, such that, the RFID tag once placed in the SIM card tray and inserted in the associated fixed slot, may be ejected by inserting an ejecting pin in an aperture provided for activating the ejection mechanism. By way of another example, a fixed slot 210 may be in the form of a SIM card holder, such that, when the RFID tag is completely inserted in the fixed slot 210, the RFID tag is held inside the fixed slot 210. However, when a user further pushes the RFID tag inside the fixed slot 210, the RFID tag is automatically ejected from the fixed slot 210, as an ejection mechanism is activated because of the user action. It will be apparent to a person skilled in the art that various other mechanisms for receiving and subsequently ejecting an RFID tag from an associated fixed slot 210 may be adapted and implemented in the wearable multi RFID device 102.

Additionally, since each of the plurality of fixed slots 210 are communicatively coupled to the processor 202, whenever, an RFID tag is inserted in a fixed slot 210, the processor 202 identifies an ID of the RFID tag and maps the identified ID to a position of the fixed slot 210. By way of an example, if the wearable multi RFID device 102 includes five fixed slots and an RFID tag is inserted in the third fixed slot, the processor 202 first identifies the ID of the RFID tag and then creates a mapping between the ID of the RFID tag and the third fixed slot. The processor 202 then stores the mapping in the memory 204. Various modules in the memory 204 are described in detail later.

The outer casing 206 may at least partially enclose the inner housing 208 circumferentially. This is further depicted in detail in conjunction with FIGS. 3A and 3B. The outer casing 206 may further be configured to slide around the inner housing 208 in a container (not shown in FIG. 2). The outer casing 206 may include a layer of electromagnetic shielding material. The outer casing 206 may be in the form of a ring and may thus be rotatable around the inner housing 208. As a result of such rotation, at a first position, the outer casing 206 may shield the plurality of RFID tags from being scanned. The first position has already been explained in detail in conjunction with FIG. 1. Further, the outer casing 206 may selectively expose (or activate) one of the plurality of RFID tags for being scanned, at an associated second position from a plurality of second positions. The plurality of second positions have already been explained in detail in conjunction with FIG. 1.

In order to rotate the outer casing 206, the wearable multi RFID device 102 may also include a rotation mechanism 212 that is communicatively coupled to the processor 202. The rotation mechanism 212 may also be operatively coupled to the outer casing 206 and may be configured to rotate the outer casing 206, such that, the rotation mechanism 212 may selectively move or rotate the outer casing 206 to the first position and each of the plurality of second positions. The rotation mechanism 212 may be a low energy engine.

In an embodiment, the wearable multi RFID device 102 may include one or more buttons that may initiate operation of the rotation mechanism 212 in order to rotate the outer casing 206. In another embodiment, the outer casing 206 may have cogs in an inner side. In this case, the rotation mechanism 212 may also have cogs that may interlock and cooperate with the cogs in the inner surface of the outer casing 206, to enable movement of the outer casing 206. In other words, the cooperation between the rotation mechanism 212 and the outer casing 206 may work as a gear mechanism. This is further explained in detail in conjunction with FIG. 6.

The wearable multi RFID device 102 may also include a plurality of sensors 214 and a communication module 216, each of which are communicatively coupled to the processor 202. Examples of the plurality of sensors 214 may include, but are not limited to a Global Positioning System (GPS) sensor, a proximity sensor, a compass, a gyroscope, a microphone, 3D inclinometer, an accelerometer, a camera, or a pedometer. Each of the plurality of sensors 214 is configured to capture one or more of a set of external parameters. Examples of the external parameters may include, but are not limited to a location, date and time, gesture, or voice inputs. By way of an example, one or more of the compass, the gyroscope, and the 3D inclinometer may be configured to identify a hand gesture or a specific pattern of vibrating or shaking of the wearable multi RFID device 102.

Additionally, the communication module 216 may also be configured to capture one or more of the set of external parameters. The communication module 216, for example, may be a Wi-Fi module, a GSM module, a CDMA module, an LTE module, a WiMAX module, a Bluetooth module, or a combination thereof. In this case, the external parameters may include, but are not limited to network Service Set Identifiers (SSIDs) of a Wi-Fi network or a cell ID of one or more neighboring Base Stations (BS). By way of an example, a Wi-Fi module may be configured to identify network SSIDs and an LTE module may be configured to identify cell ID of neighboring Evolved Node Base stations (eNodeB). The communication module 216 may also be used by the wearable multi RFID device 102 to establish communication with one or more external devices 218, via a network 220, to transmit or receive data. Examples of the one or more external devices may include, but are not limited to smartphones, laptops, desktops, tablets, or other smart devices.

In an embodiment, the communication module 216 may be used to pair the wearable multi RFID device 102 with one of the one or more external devices 218 (for example, a smartphone). The pairing may be used to activate a security mechanism, such that, whenever the wearable multi RFID device 102 is not in close proximity to the paired external device, the wearable multi RFID device 102 may be rendered useless in order to prevent any malicious use. The security mechanism may be useful in case of loss or theft of the wearable multi RFID device 102.

In order to enable the wearable multi RFID device 102 to perform various functionalities, the memory 204 may include a mapping creation module 222, a parameters analyzing module 224, a criterion matching module 226, a rule engine 228, a notification generation module 230, and a mapping database 232. The mapping creation module 222, via the processor 202, may create a mapping between IDs of each of the plurality of RFID tags and an associated fixed slot 210 from the plurality of fixed slots 210. The mapping creation module 222 may then store the mapping in the form a mapping table in the mapping database 232. Each time an RFID tag is removed from an associated fixed slot 210, the mapping creation module 222 may remove the mapping between that RFID tag and the associated fixed slot 210 from the mapping table. In a similar manner, each time a new RFID tag is inserted in a fixed slot 210, the mapping creation module 222 may update the mapping table with the mapping between an ID of the new RFID tag and the fixed slot 210. By way of an example, if the wearable multi RFID device 102 includes ten fixed slots, and six of these fixed slots have received an RFID tag, then the mapping table may include mapping between each of the six fixed slot and an ID of the received RFID tag. Remaining four fixed slots may be marked as empty in the mapping table.

In an embodiment, the wearable multi RFID device 102 may further include a display 234, which may further include a User Interface (UI) 236. In an embodiment, the UI 236 may be used by a user to create a mapping between each of a newly inserted RFID tag and a fixed slot 210 receiving the RFID tag. Additionally or alternatively, whenever an RFID tag is inserted into a fixed slot 210, the display 234 may indicate the sequence number of the fixed slot 210. In continuation of the above example, when an RFID tag is inserted in the sixth fixed slot, the display 234 may display "Sixth fixed slot."

The parameters analyzing module 224 may receive, via the processor 202, one or more of the set of external parameters as captured by one or more of the plurality of sensors 214 or by the communication module 216. The parameters analyzing module 224 may then organize and segregate the one or more external parameters, based on their associated type. By way of an example, the parameters analyzing module 224 may separate each of the location data, the gesture data, the voice data, and the BS cell ID data. Thereafter, the parameters analyzing module 224 may share parameter values for each type of external parameters with the criterion matching module 226.

The criterion matching module 226 may then extract a current set of tag exposing (or activating) rules from the rule engine 228. Each of the set of tag exposing rules may be associated with an RFID tag currently inserted in one of the plurality of fixed slots 210. A tag exposing rule associated with an RFID tag, for example, may indicate the criterion to expose the RFID tag for being scanned. A tag exposing rule may be created at the time of insertion of an RFID tag and may also be modified at a later time. In an embodiment, when an RFID tag is removed or ejected from an associated fixed slot 210, a tag exposing rule created for that RFID tag may also be automatically removed from the rule engine 228.

By way of an example, a tag exposing rule may indicate that a given RFID tag having a certain ID may be exposed when value of the captured location data matches with a predefined location linked with the RFID tag. By way of another example, a tag exposing rule may indicate that a given RFID tag having a certain ID may be exposed when cell ID captured for a BS matches with a BS cell ID linked with the RFID tag. By way of yet another example, a tag exposing rule may indicate that a given RFID tag having a certain ID may be exposed, when value of a hand gesture data, matches with a predefined hand gesture linked to the RFID tag.

The set of tag exposing rules may be created by a user, via the UI 236. Alternatively, a user may create the set of tag exposing rules through a software application installed on an external device that is communicatively coupled to the wearable multi RFID device 102. In an embodiment, the rule engine 228 may also include a machine learning model (not shown in FIG. 2), such that, the machine learning module may be trained to automatically created tag exposing rules for newly inserted RFID tags.

Once the criterion matching module 226 has received parameter values for each type of external parameters and the current set of tag exposing rules, the criterion matching module 226 also access the mapping table stored in the mapping database 232. Thereafter, based on the parameter values, the criterion matching module 226 may first determine a tag exposing rule that maps on to a specific parameter value. Based on the tag exposing rule, the criterion matching module 226 may then identify an ID of an RFID tag associated with that tag exposing rule. Lastly, based on the identified ID, the criterion matching module 226 may determine the fixed slot 210 mapped to the identified ID. Once the fixed slot 210 has been determined, one or more of the set of external parameters are deemed to satisfy one or more criteria associated with the RFID tag inserted in the fixed slot 210. Accordingly, the RFID tag is exposed (or activated) for being scanned. It will be apparent to a person skilled in the art that functionality of each of the parameters analyzing module 224, the criterion matching module 226, and the rule engine 228 may be performed by a single module.

When one or more of the set of external parameters are deemed to satisfy one or more criterion associated with an RFID tag inserted in a fixed slot 210, the processor 202 may instruct the rotation mechanism 212 to rotate the outer casing 206 from the first position to a second position from the plurality of second positions, such that, the second position is associated with the fixed slot 210. By way of an example, if the third fixed slot is identified by the criterion matching module 226, the rotation mechanism 212 rotates the outer casing 206, such that, the non-shielded portion of the outer casing 206 is aligned with the third fixed slot, thereby exposing (or activating) the RFID tag in the third fixed slot for being scanned.

Once the RFID tag has been exposed for being scanned, the RFID tag may either be authenticated or may be rejected by a scanning device (for example, the RFID scanner 106) after being scanned. When the RFID tag is rejected by the scanning device, the notification generation module 230 may generate a notification that includes details (for example, ID, make, and type of the RFID tag, i.e., active or passive) associated with the RFID tag and a type of the rejection. The notification generation module 230 (via the processor 202, the communication module 216, and the network 220) may share the notification with one or more interested parties, which may also include the user. Other examples of interested parties may include entity owning the scanning device, manufacturers of the RFID tag, and manufactures of the wearable multi RFID device 102.

Additionally, for such scenarios, the wearable multi RFID device 102 may include a fail-safe module 238. Thus, when an RFID tag is rejected after being scanned, the fail-safe module 238 may selectively expose one or more of the remaining plurality of RFID tags for being scanned in a predefined sequential pattern. The predefined sequential pattern, for example, may expose each of the remaining plurality of RFID tags for a predefined time duration, until either one of the remaining plurality of RFID tags is authenticated or all the remaining plurality of RFID tags have been scanned and rejected. It will be apparent to a person skilled in the art that various combinations of scanning the remaining plurality of RFID tags may be implemented. To this end, the fail-safe module 238 may instruct the rotation mechanism 212, via the processor 202, to implement the predefined sequential pattern. In an embodiment, the fail-safe module 238 may also include a machine learning model (not shown in FIG. 2), such that, the machine learning module may be trained to automatically generate a sequential pattern, based on an RFID tag that was rejected after being scanned.

When none of the set of external parameters satisfy one or more criterion associated with the plurality of RFID tags, the processor 202 may instruct the rotation mechanism 212 to rotate the outer casing 206 from one of the plurality of second positions to the first position, such that, each of the plurality of RFID tags are shielded from being scanned. In other words, the non-shielded portion of the outer casing 206 is aligned with either an empty fixed slot 210 or with a false slot that is not configured to receive an RFID tag. The outer casing 206 may remain in the first position, until one or more of the set of external parameters are deemed to satisfy one or more criterion associated with an RFID tag.

Figure 3A:
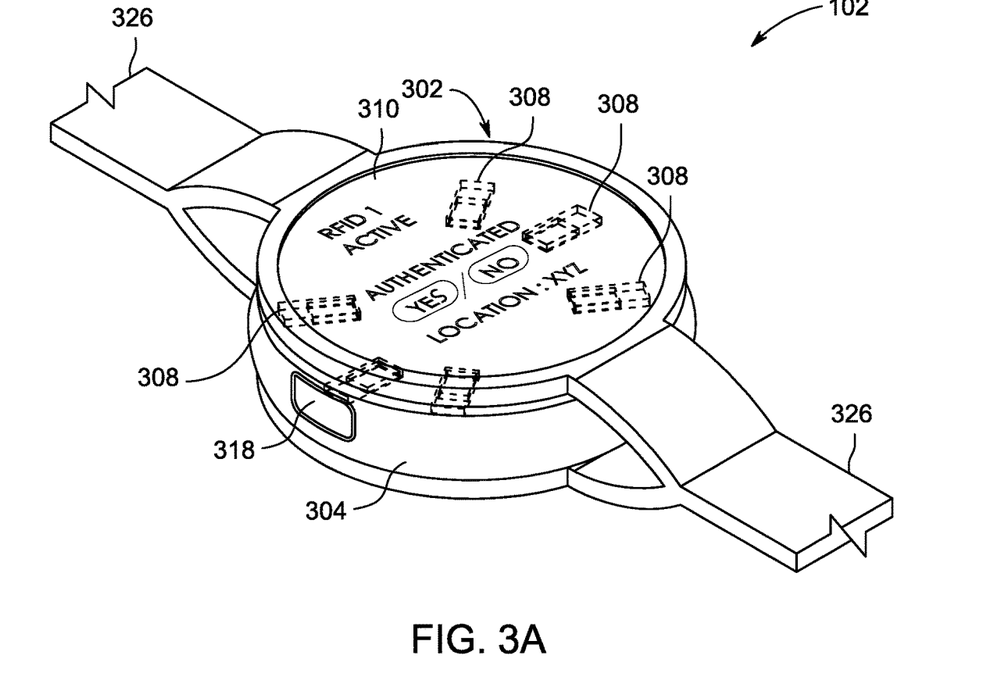
FIGS. 3A and 3B illustrate perspective views of a wearable multi RFID device, in accordance with an exemplary embodiment.
Figure 3B:
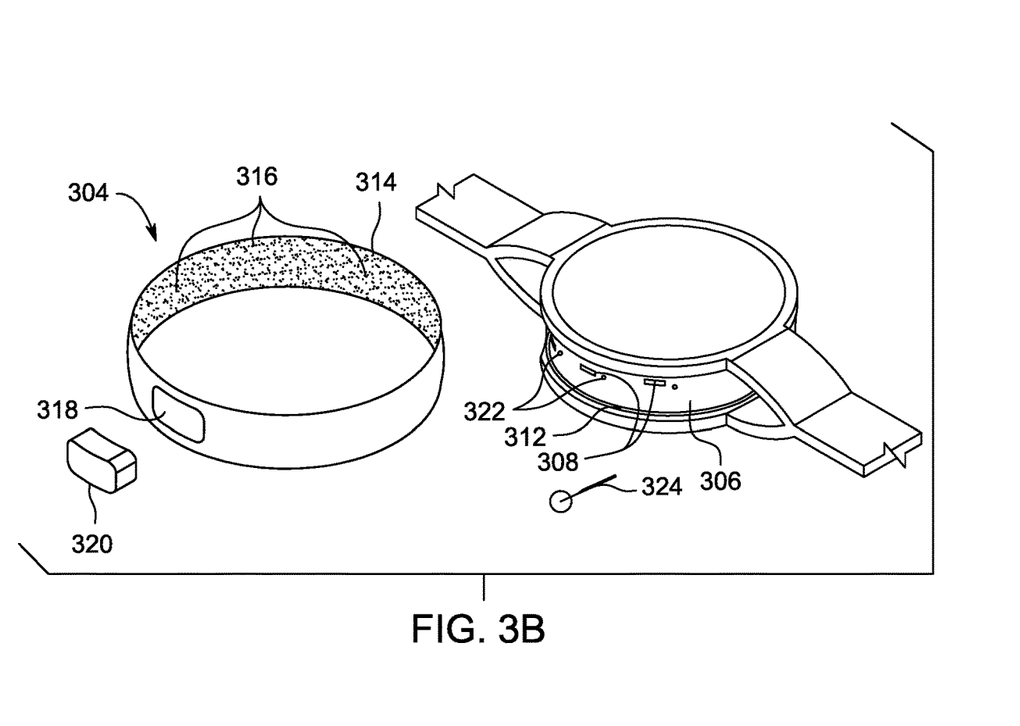

Referring now to FIGS. 3A and 3B, perspective views of the wearable multi RFID device 102 are illustrated, in accordance with an exemplary embodiment. In this exemplary embodiment, the wearable multi RFID device 102 is in the form of a wrist watch. In FIG. 3A, the wearable multi RFID device 102 is depicted to include a container 302 that includes an outer casing 304, an inner housing 306 that further includes a plurality of fixed slots 308, and a display 310. The outer casing 304 at least partially encloses the inner housing 306 circumferentially and may slide around the inner housing 306 within the container 302. The container 302, for example, may include grooves 312 (shown in FIG. 3B) throughout its outer periphery, which may cooperate with and may receive the outer casing 304 in order to enable the outer casing 304 to circumferentially enclose and slide around the inner housing 306.

In the current exemplary embodiment, the plurality of fixed slots 308 are perpendicular to the outer casing 304. In other words, RFID tags may be inserted horizontally in each of the plurality of fixed slots 308. The outer casing 304 may be made up of plastic or other composite material, for example. Further, as explained earlier and as depicted in FIG. 3B, an inner side 314 of the outer casing 304 may be partially covered with a layer 316 of electromagnetic shielding material (for example, aluminum). Since the outer casing 304 is partially covered, the outer casing 304 includes a non-shielded portion 318, which is not shielded by the layer 316 of electromagnetic shielding material.

As described earlier, an RFID tag is exposed for being scanned, when the non-shielded portion 318 aligns with a fixed slot 308 that received the RFID tag. The non-shielded portion 318 may be covered by a removable cap 320, such that, when the removable cap 320 is removed, the opening left thereof in the outer casing 304 may be used to insert or remove RFID tags from respective fixed slots 308. Alternatively, the non-shielded portion 318 may be integrated within the outer casing 304. In this case, in order to insert or remove RFID tags from respective fixed slots 308, the outer casing 304 may first be removed. To enable this, the outer casing 304 may be made up of a slightly stretchable material, such that, the outer casing 304 may be easily removed and affixed thereafter.

Further, in FIG. 3B, the outer casing 304 is depicted separately from the wearable multi RFID device 102. Additionally, FIG. 3B clearly depicts the inner side 314, the layer 316 of electromagnetic shielding material, the non-shielded portion 318, and the removable cap 320, when removed from the outer casing 304. Moreover, the inner housing 306 is clearly depicted in FIG. 3B. As is apparent from FIG. 3B, each of the fixed slots 308 also have an ejector pin hole 322, which may be used to eject an RFID tag from the respective fixed slot 308 by using an ejector pin 324.

The display 310, for example, may indicate an RFID tag that is currently exposed for being scanned, authentication status for the RFID tag after being scanned, and current location of the user wearing the wearable multi RFID device 102. Additionally, the display 310 may also show the current time and other details displayed on a smartwatch (for example, number of steps, calories burnt, floors climbed, etc.). The wearable multi RFID device 102 may also include a fastening member 326 that may cooperate with a wrist of the user in order to hold the wearable multi RFID device 102 in place. The fastening member 326 may be a strap that is integrated with various fastening mechanisms, for example, Velcro, snaps, hooks and eyes, and elastic.

Figure 4A:
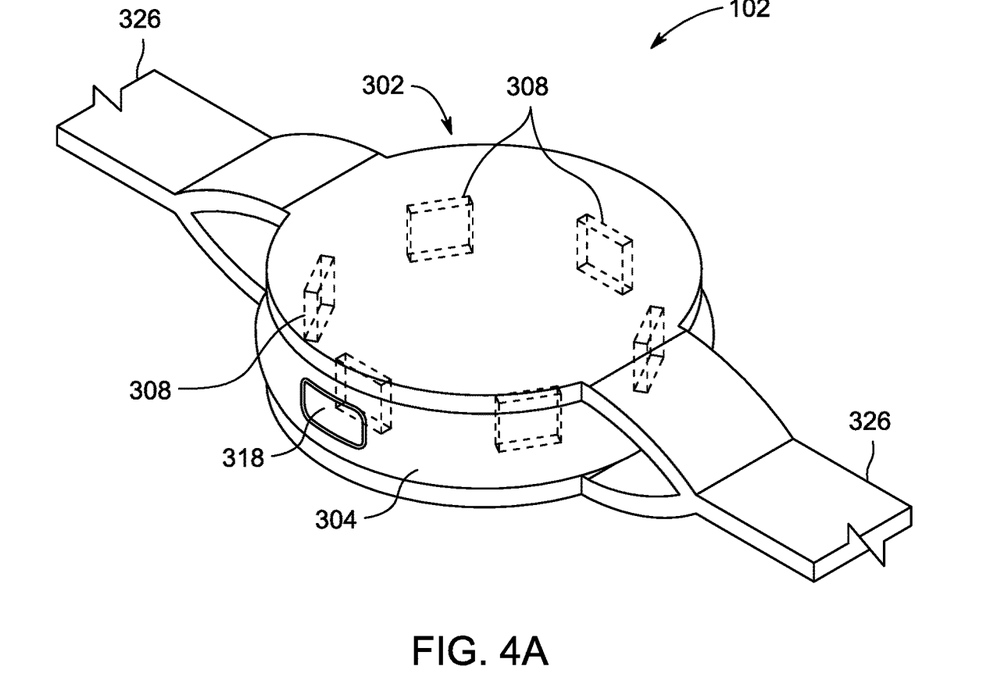
FIGS. 4A and 4B illustrate a perspective view and a bottom view (respectively) of a wearable multi RFID device, in accordance with another exemplary embodiment.
Figure 4B:
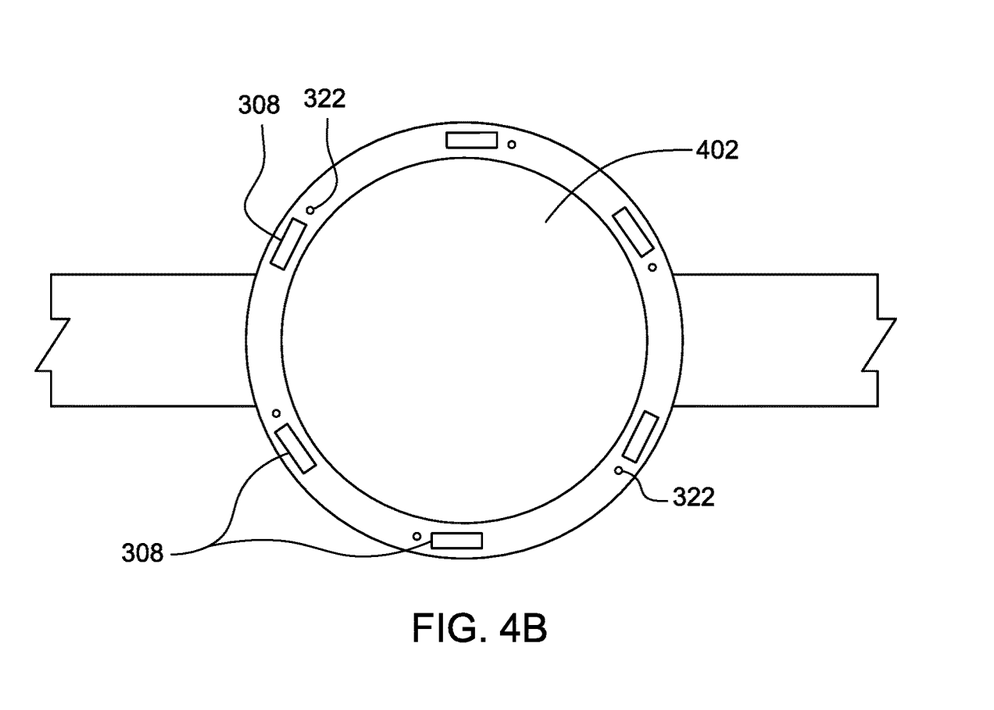

Referring now to FIGS. 4A and 4B, a perspective view and a bottom view of the wearable multi RFID device 102 is illustrated, in accordance with another exemplary embodiment. In this exemplary embodiment, the wearable multi RFID device 102 is in the form of a wrist watch. While FIG. 4A the perspective view, FIG. 4B depicts the bottom view. With reference to FIGS. 3A and 3B, the only difference in the current exemplary embodiment is that the plurality of fixed slots 308 are parallel to the outer casing 304. In other words, RFID tags may be inserted vertically in the plurality of fixed slots 308. As depicted in FIG. 4B, a bottom side 402 of the wearable multi RFID device 102 may be used to insert or remove RFID tags. Additionally, in this exemplary embodiment, the outer casing 304 may not include the removable cap 320. In other word, the non-shielded portion 318 may be integrated within the outer casing 304.

Figure 5A:
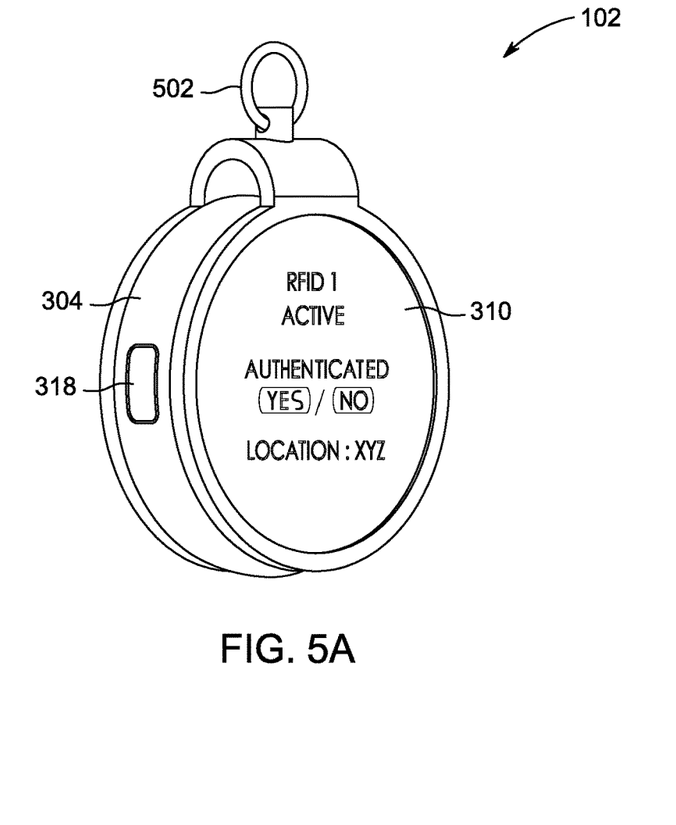
FIGS. 5A and 5B illustrate perspective views of a wearable multi RFID device, in accordance with yet another exemplary embodiment.
Figure 5B:
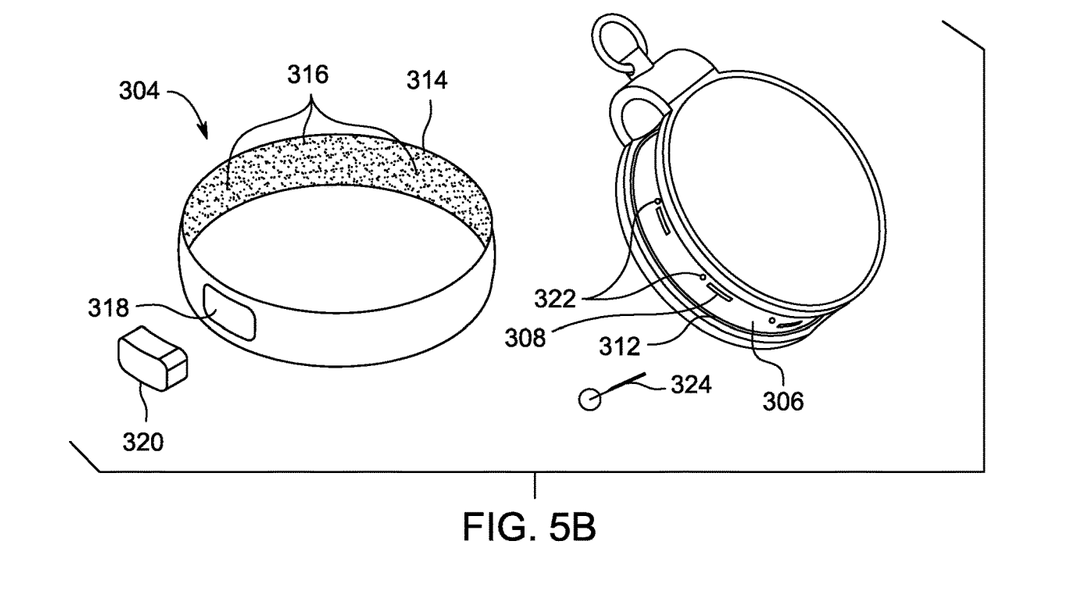

Referring now to FIGS. 5A and 5B, perspective views of the wearable multi RFID device 102 are illustrated, in accordance with yet another exemplary embodiment. In this exemplary embodiment, the wearable multi RFID device 102 is in the form of a key ring, pendant, or a badge holder. In this exemplary embodiment, the wearable multi RFID device 102 may include a fastening member 502 that may be used to attach to a clothing, ornament, or accessory worn by the user. Other than this difference, functioning of the wearable multi RFID device 102 is same as that described in FIGS. 3A, 3B, 4A, and 4B.

Figure 6:
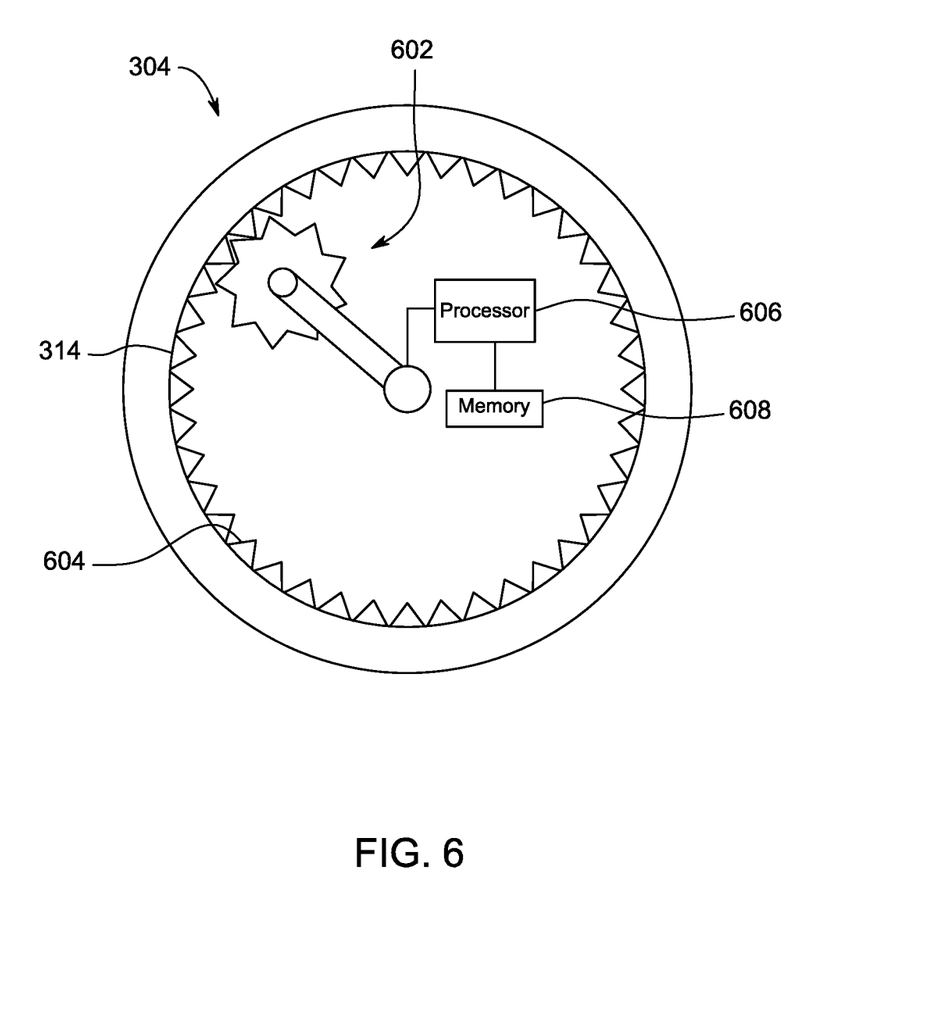
FIG. 6 illustrates a rotation mechanism deployed to rotate an outer casing of a wearable multi RFID device, in accordance with an exemplary embodiment.

Referring now to FIG. 6, a rotation mechanism 602 (analogous to the rotation mechanism 212) deployed to rotate the outer casing 304 of the wearable multi RFID device 102 is illustrated, in accordance with an exemplary embodiment. As depicted, the inner side 314 of the outer casing 304 may have cogs 604 in its inner periphery. The rotation mechanism 602 may also have cogs, that may cooperate and interlock with the cogs 604. The rotation mechanism 602, for example, may be a low energy engine. The rotation mechanism 602 may be communicatively coupled to a processor 606 (analogous to the processor 202), which may further be coupled to a memory 608 (analogous to the memory 204).

Figure 7A:
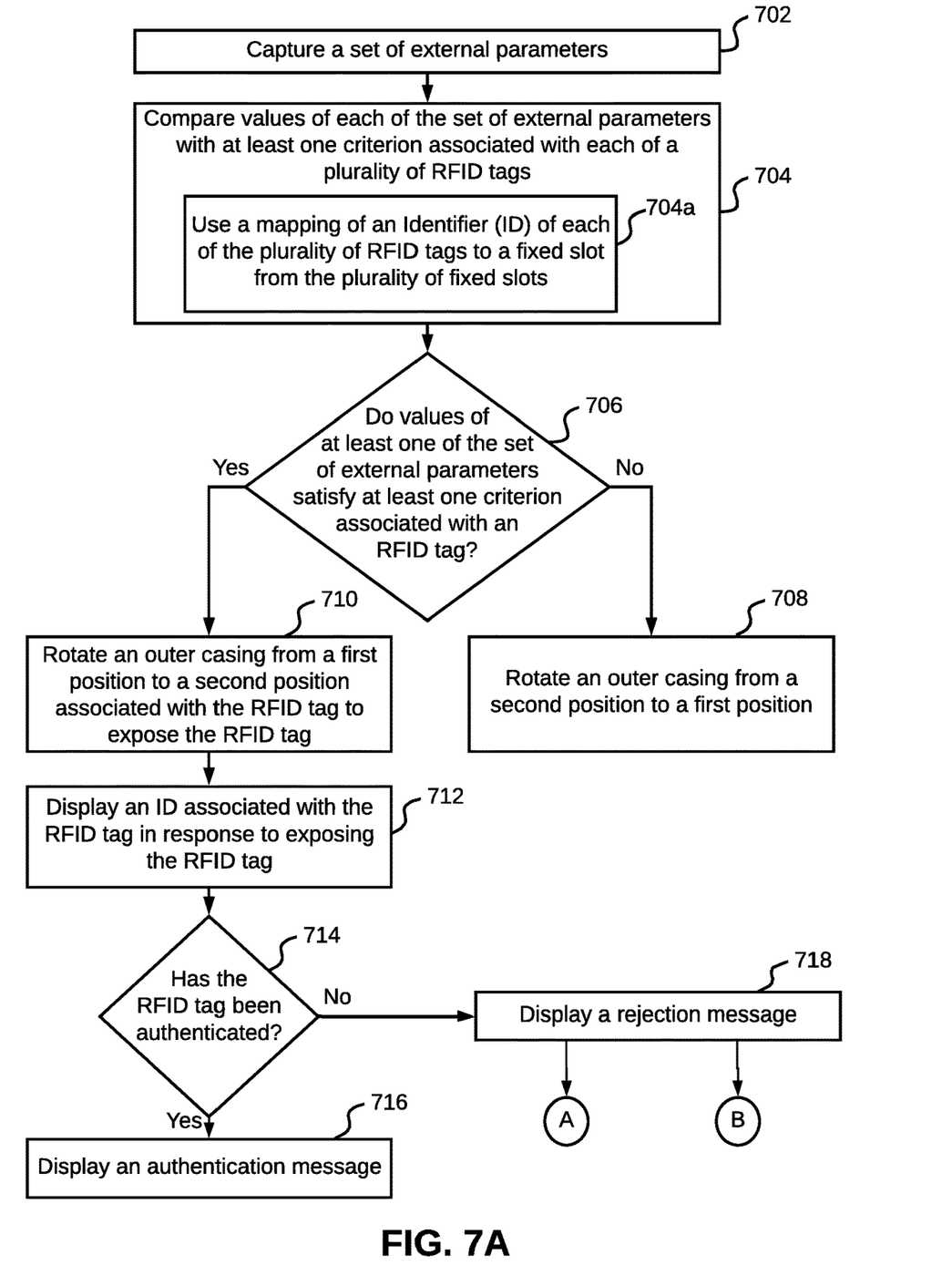
FIGS. 7A and 7B illustrate a flowchart of a method for selectively activating RFID tags in a wearable multi RFID device, in accordance with an embodiment.
Figure 7B:
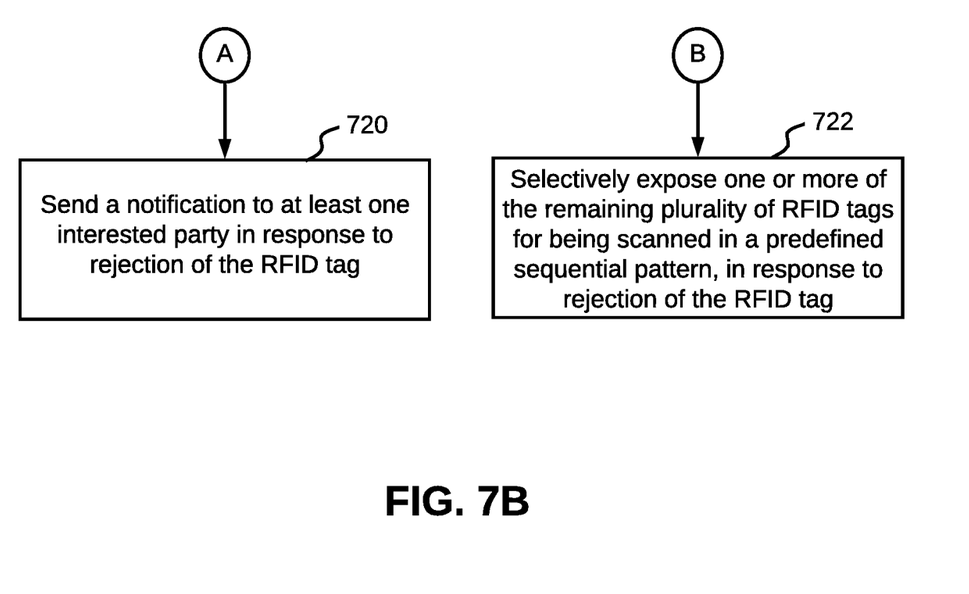

Referring now to FIGS. 7A and 7B, a flowchart of a method for selectively activating RFID tags in the wearable multi RFID device 102, in accordance with an embodiment. At step 702, a set of external parameters may be captured. Examples of the external parameters may include one or more of, but are not limited to of a location, network SSIDs, date and time, gesture, a cell ID of at least one neighboring BS, or voice inputs. At step 704, values of each of the set of external parameters may be compared with one or more criteria associated with each of a plurality of RFID tags. To this end, at step 704a, a mapping of an ID of each of the plurality of RFID tags to a fixed slot from the plurality of fixed slots may be used. This has already been explained in detail in conjunction with FIG. 2.

At step 706, a check is performed to determine whether values of one or more of the set of external parameters satisfy one or more criteria associated with an RFID tag from the plurality of RFID tags. If values of none of the set of external parameters satisfy one or more criteria associated with any RFID tag, at step 708, the outer casing 304 is rotated from a second position in a plurality of second positions to a first position. This has already been explained in detail in conjunction with FIG. 1 and FIG. 2.

Referring back to step 706, if values of one or more of the set of external parameters satisfy one or more criteria associated with an RFID tag from the plurality of RFID tags, at step 710, the outer casing 304 is rotated from the first position to a second position associated with the RFID tag to expose (or activate) the RFID tag for being scanned. In this case, the remaining plurality of RFID tags remain shielded via the electromagnetic shielding material in the outer casing 304. This has already been explained in detail in conjunction with FIG. 1 and FIG. 2. At step 712, an ID associated with the RFID tag may be displayed in response to exposing the RFID tag. The ID, for example, may be displayed on the display 310 of the wearable multi RFID device 102.

After the RFID tag has been exposed for being scanned, a check is performed, at step 714, to determine whether the RFID tag has been authenticated by a scanning device (for example, the RFID scanner 106). If the RFID tag is authenticated, an authentication message may be displayed at step 716. The authentication message may be displayed on the display 310 of the wearable multi RFID device 102. However, if the RFID tag is not authenticated or is rejected, a rejection message may be displayed at step 718. The rejection message may be displayed on the display 310 of the wearable multi RFID device 102.

After step 718, steps 720 and/or 722 may be performed. It may be noted that steps 720 and 722 may either be performed sequentially or in parallel. At step 720, a notification may be sent to one or more interested parties. The notification may include detail associated with the RFID tag and a type of the rejection. This has already been explained in detail in conjunction with FIG. 2. At step 722, one or more of the remaining plurality of RFID tags may be selectively exposed for being scanned in a predefined sequential pattern. This has already been explained in detail in conjunction with FIG. 2.

Figure 8:
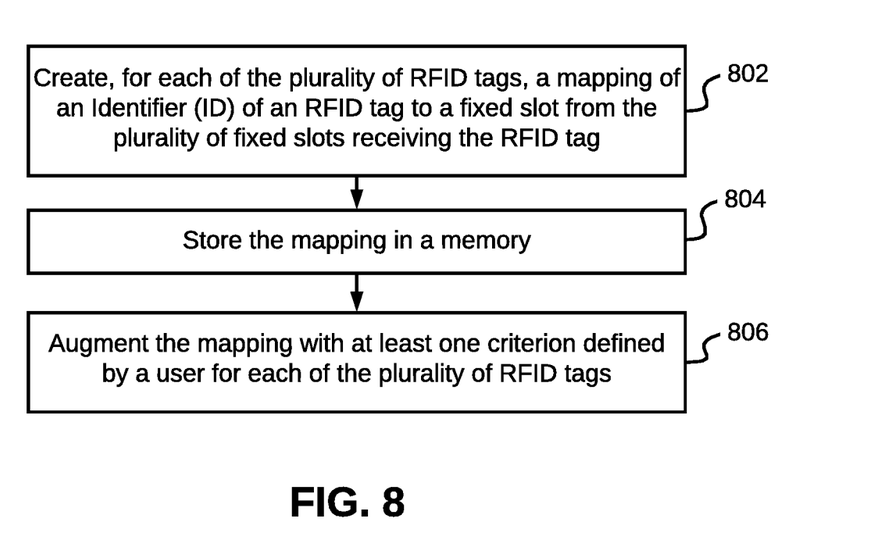
FIG. 8 is a flowchart of a method for managing a mapping between IDs of a plurality of RFID tags to a plurality of fixed slots receiving the plurality of RFID tags, in accordance with an embodiment.

Referring now to FIG. 8, a flowchart of a method for managing a mapping between IDs of the plurality of RFID tags to a plurality of fixed slots receiving the plurality of RFID tags, in accordance with an embodiment. At step 802, for each of the plurality of RFID tags, mapping of an ID of an RFID tag to a fixed slot from the plurality of fixed slots receiving the RFID tag is created. At step 804, the mapping is stored in a memory (for example, the memory 204). At step 806, the mapping may be augmented with one or more criteria defined by a user for the RFID tag by a user for each of the plurality of RFID tags. The one or more criteria may be associated with the set of external parameters.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide a multi Radio Frequency Identification (RFID) device with selective activation of RFID tags. The multi RFID device may be used in daily activities by configuring multiple RFID tags within a single device to access restricted areas and services. As a result, all such activities may be easily managed in a simplified way, using a single RFID device, which may be a wearable device, for example. The multi RFID device frees a user from having to carry multiple RFID cards with him/her.

The multi RFID device, in addition to providing a single device that groups or integrates multiple RFID cards into one, also automatically identifies an RFID tag from the multiple RFID tags that should be made accessible for being scanned at a given location. To this end, when values of one or more external parameters match a criterion defined for an RFID tag, an outer casing that includes a layer of electromagnetic shielding material selectively exposes (or activates) that RFID tag for being scanned, while shielding the remaining RFID tags multi RFID device.

The specification has described a multi RFID device with selective activation of RFID tags. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A wearable multi Radio Frequency Identification (RFID) device comprising:
   a container, wherein the container comprises:
      an inner housing comprising a plurality of fixed slots, wherein the plurality of fixed slots are configured to receive a plurality of RFID tags;
      an outer casing at least partially enclosing the inner housing circumferentially and configured to slide around the inner housing in the container, wherein the outer casing comprises a layer of electromagnetic shielding material, and wherein the outer casing is further configured to:
         shield the plurality of RFID tags from being scanned, at a first position; and
         selectively expose one of the plurality of RFID tags for being scanned, at an associated second position from a plurality of second positions.

2. The wearable multi RFID device of claim 1, further comprising a rotation mechanism configured to cooperate with the outer casing to rotate the outer casing around the inner housing.

3. The wearable multi RFID device of claim 2, wherein the rotation mechanism is manually operable to rotate the outer casing around the inner housing.

4. The wearable multi RFID device of claim 2, further comprising:
- at least one sensor configured to capture a set of external parameters;
- a processor communicatively coupled to the at least one sensor, the rotation mechanism, and each of the plurality of fixed slots; and
- a memory communicatively coupled to the processor, wherein the memory comprises processor instructions, which when executed by the processor, cause the processor to:
  - instruct the rotation mechanism to rotate the outer casing from the first position to one of the plurality of second positions, when at least one of the set of external parameters satisfy at least one criterion associated with an RFID tag from the plurality of RFID tags, and wherein each of the plurality of second positions is associated with an RFID tag from the plurality of RFID tags; and
  - instruct the rotation mechanism to rotate the outer casing from one of the plurality of second positions to the first position, when none of the set of external parameters satisfy at least one criterion associated with an RFID tag from the plurality of RFID tags.

5. The wearable multi RFID device of claim 4, wherein the processor is further configured to:
- create a mapping of an Identifier (ID) of an RFID tag from the plurality of RFID tags to a fixed slot from the plurality of fixed slots receiving the RFID tag;
- store the mapping in the memory; and
- augment the mapping with at least one criterion defined for the RFID tag by a user, wherein the at least one criteria is associated with the set of external parameters.

6. The wearable multi RFID device of claim 2, wherein the rotation mechanism is a low energy engine.

7. The wearable multi RFID device of claim 1, further comprising a display, wherein the display is configured to:
- display an ID associated with a currently exposed RFID tag from the plurality of RFID tags, in response to rotating the outer casing from the first position to a second position associated with the currently exposed RFID tag; and
- display a message upon authentication or rejection of the currently exposed RFID tag after being scanned.

8. The wearable multi RFID device of claim 1, wherein a position of each of the plurality of fixed slots with respect to the outer casing is one of perpendicular or parallel.

9. The wearable multi RFID device of claim 1, wherein the RFID tag is one of a passive RFID tag or an active RFID tag.

10. A method of selectively activating Radio Frequency Identification (RFID) tags in a wearable multi RFID device, the method comprising:
- capturing a set of external parameters;
- comparing values of each of the set of external parameters with at least one criterion associated with each of a plurality of RFID tags, wherein each of the plurality of RFID tags are inserted in one of a plurality of fixed slots in an inner housing within the wearable multi RFID device; and
- exposing an RFID tag from the plurality of RFID tags for being scanned, when values of at least one of the set of external parameters satisfy at least one criterion associated with the RFID tag, wherein a remaining plurality of RFID tags remain shielded via an electromagnetic shielding material.

11. The method of claim 10, further comprising rotating an outer casing from a first position to a second position associated with the RFID tag to expose the RFID tag, wherein the outer casing circumferentially encloses the inner housing and is configured to rotate around the inner housing, and wherein the outer casing is at least partially covered with a layer of the electromagnetic shielding material.

12. The method of claim 10, further comprising:
- creating a mapping of an Identifier (ID) of an RFID tag from the plurality of RFID tags to a fixed slot from the plurality of fixed slots receiving the RFID tag; and
- storing the mapping in a memory.

13. The method of claim 12, further comprising augmenting the mapping with at least one criterion defined for the RFID tag by a user, wherein the at least one criteria is associated with the set of external parameters.

14. The method of claim 13, further comprising using the mapping to compare values of each of the set of external parameters with at least one criterion associated with each of the plurality of RFID tags.

15. The method of claim 10, further comprising:
- displaying an ID associated with the RFID tag in response to exposing the RFID tag; and
- displaying a message upon authentication or rejection of the RFID tag after being scanned.

16. The method of claim 15, further comprising sending a notification to at least one interested party in response to rejection of the RFID tag after being scanned, wherein the notification comprises detail associated with the RFID and a type of the rejection.

17. The method of claim 15, further comprising selectively exposing one or more of the remaining plurality of RFID tags for being scanned in a predefined sequential pattern, in response to rejection of the RFID tag after being scanned.

18. The method of claim 10, wherein the RFID tag is one of a passive RFID tag or an active RFID tag.

19. The method of claim 10, wherein the set of external parameters comprises at least one of a location, network Service Set Identifiers (SSIDs), date and time, gesture, a cell ID of at least one neighboring Base Station (BS), or voice inputs.

20. A non-transitory computer-readable medium, for allocating resources to containers, having stored thereon, a set of computer-executable instructions causing a computer comprising one or more processors to perform steps comprising:
- capturing a set of external parameters;
- comparing values of each of the set of external parameters with at least one criterion associated with each of a plurality of RFID tags, wherein each of the plurality of RFID tags are inserted in one of a plurality of fixed slots in an inner housing within the wearable multi RFID device; and
- exposing an RFID tag from the plurality of RFID tags for being scanned, when values of at least one of the set of external parameters satisfy at least one criterion associated with the RFID tag, wherein a remaining plurality of RFID tags remain shielded via an electromagnetic shielding material.

* * * * *